Aug. 30, 1938.    J. E. ANDREAU    2,128,686
STREAMLINED AUTOMOBILE VEHICLE
Filed May 22, 1935    2 Sheets-Sheet 1
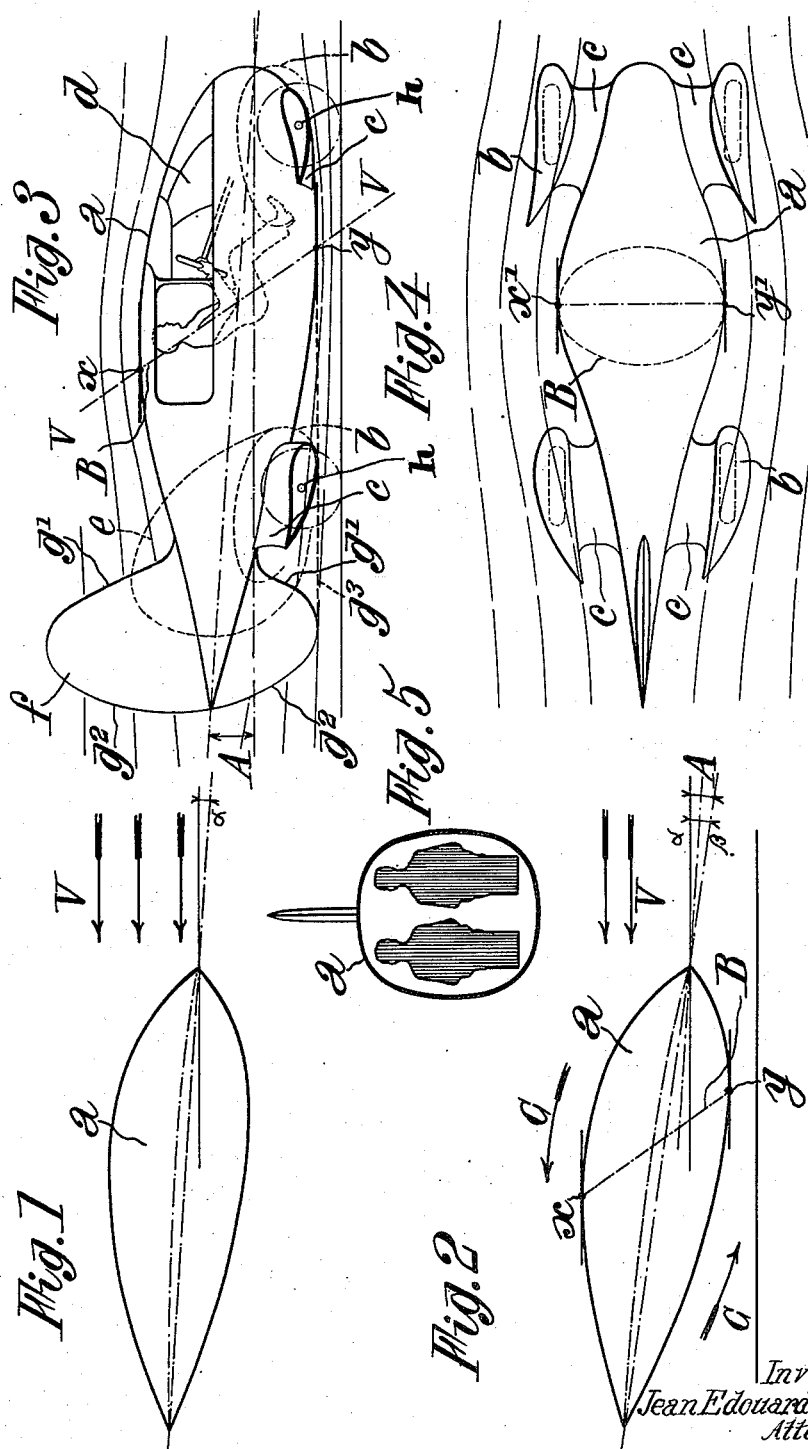
Inventor:
Jean Edouard Andreau
Attorneys:
Bailey & Larson Aug. 30, 1938.   J. E. ANDREAU   2,128,686
STREAMLINED AUTOMOBILE VEHICLE
Filed May 22, 1935   2 Sheets-Sheet 2

Inventor:
Jean Edouard Andreau
Attorneys:
Bailey Carson

Patented Aug. 30, 1938

2,128,686

UNITED STATES PATENT OFFICE 2,128,686

STREAMLINED AUTOMOBILE VEHICLE

Jean Edouard Andreau, Paris, France, assignor to The Society "S. E. B. A. Societe Anonyme d'Exploitation de Brevets d'Automobiles", Glaris, Switzerland, a society of Switzerland Application May 22, 1935, Serial No. 22,867 In Belgium May 25, 1934

4 Claims. (Cl. 296—1)

The present invention relates to streamlined automobile vehicles, and it is more especially, although not exclusively, concerned with road vehicles and automotive railroad vehicles.

The object of the present invention is to provide a vehicle of this type in which the longitudinal head resistance is reduced to a minimum.

It is known that when an asymmetrical body, such for instance as a portion of an airplane wing, moves in the atmosphere, without any interaction due to the ground, there exists a position of this body, corresponding to what is called the zero lift angle of incidence, for which, as a rule, the drag resistance is minimum.

As a matter of fact, the algebraic expression of the longitudinal head resistance includes a term proportional to the square of the lift and a term proportional to the lift.

The zero lift angle is negative for profiles in which the median line is so shaped that its concavity is turned downwardly, and it is all the greater as the curvature of this line is more accentuated.

It is known that there also exists a zero lift angle for all asymmetrical streamline structures, such as the streamlined bodies of automobile vehicles, whatever be the shape of their outline in vertical projection.

However for these streamlined bodies the zero lift angles are always smaller than those corresponding to airplane wings of the same vertical section because the latter are subjected to a cylindrical stress which is stronger than that acting on said streamline bodies and which is intermediate between a spherical stress and a cylindrical stress.

Therefore, an asymmetrical streamlined body, in order to have the minimum longitudinal head resistance if no interaction due to the proximity of the ground intervenes, must make with the direction of the relative wind an angle, generally a negative one, which can easily be determined, for instance experimentally, and which depends only upon the characteristics of the streamlined body.

The essential feature of the present invention consists in devising vehicles of the automobile kind that are to run close to the ground in such manner that their streamlined surface makes with the ground an angle of incidence equal, in magnitude, to the sum of an angle substantially equal to this zero lift angle of incidence (which may be zero in some cases, for instance if the streamlined body is symmetrical) and of a complementary negative angle of incidence adapted to compensate, at least partly, for the supplementary lift due to the vicinity of the ground.

Another feature of the present invention consists in giving the streamlined body of the vehicle a shape such that the transverse plane corresponding to the maximum area of section is inclined downwardly and frontwardly.

Other features of the present invention will result from the following detailed description of some specific embodiments thereof.

Preferred embodiments of the present invention will be hereinafter described, with reference to the accompanying drawings, given merely by way of example, and in which:

Fig. 1 is an explanatory view showing an asymmetrical streamline body disposed in the zero lift angle position in an air stream of a velocity equal to V, there being supposed to exist no interaction with the ground.

Fig. 2 is also an explanatory view showing the same asymmetric streamline body disposed in correct position according to the present invention, in the vicinity of the ground;

Fig. 3 is an elevational view of an automobile vehicle having a streamlined body according to an embodiment of the present invention, certain portions of said construction being shown in horizontal section for the purpose of comparison;

Fig. 4 is a plan view corresponding to Fig. 3;

Fig. 5 is a sectional view on the line V—V of Fig. 3;

Figure 8:
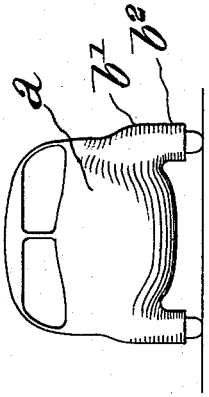
Fig. 8 is a front elevational view corresponding to Fig. 6.

The examples which will be hereinafter described with reference to the appended drawings relate to the case of streamlined automobile vehicles having four wheels.

These vehicles are made in the usual manner, with the exception of the shape of the outer surface of the body. Said outer surface is given a streamline shape.

Now, it is easy to determine the angle of incidence $\alpha$ (generally negative) to be given to the streamlined body of the vehicle ($a$ in Fig. 1) in order that the drag may be minimum when no interaction exists with the ground.

It will be readily understood that if this streamlined body $a$ were caused to move with a velocity V close to the ground, the proximity of the ground would involve a modification of the flow of air around the streamlined body, creating a supplementary lift by braking the wind between the streamlined body and the ground.

This is due to the fact that the ground has a relative velocity V, with respect to body $a$, equal to the velocity of the wind at infinity. Now, in the vicinity of the streamlined body, the wind, for the incidence $\alpha$, generally has a value higher than V.

Therefore, the braking of the wind, due to the vicinity of the ground, creates, around the streamlined body, a fluid circulation in the direction of arrows C of Fig. 2, which produces a lift which is all the greater as the ground is nearer to the streamlined body.

In order to compensate, at least partly, for this supplementary action, the streamlined body should be supported by the wheels of the vehicle in such manner that, under normal conditions of use, its resultant incidence A is equal to the sum of the absolute values on the one hand of the zero lift angle $\alpha$ above mentioned, and on the other hand of a negative incidence $\beta$ preferably such that the supplement of lift due to the vicinity of the ground is exactly compensated for.

It should be noted that the optimum value of this incidence $\beta$ depends upon the shape of the streamlined body and the distance to the ground.

In every case, it will be possible to calculate or to measure this optimum value (for instance in a wind tunnel).

Consequently, when the streamlined body shall have been disposed with the above indicated resultant incidence A with respect to the ground, it will have a very low axial head resistance and if the negative incidence $\beta$ is given its optimum value, this streamlined body will produce no lift nor any moment, so that the adhesion of the vehicle to the road will remain the same at all speeds.

If it is desired to have at least some of the wheels of the vehicle located on the outside of the main streamlined body, it will be advantageous to dispose around them small streamlined casings $b$ consisting preferably of elements of wing structures of thick section fixed to the main streamlined body $a$ in such manner as to have a general and local zero lift angle of incidence with respect to the natural streamlines around said body in each horizontal plane.

These elements of wing structure shall advantageously be given a concave outline, which involves turning the concavity of said elements toward the outside for those that are located in divergent air currents (front wheels) and toward the inside for those that are located in convergent air currents (rear wheels). With this arrangement, the streamlined casings shall have a minimum general inclination with respect to the axial vertical plane of the vehicle (Fig. 4).

In a likewise manner, if it is necessary to mask connection parts extending between streamlined body $a$ and the wheels, for instance axles $h$, springs, suspension or steering devices, these parts shall preferably be surrounded with streamlined casings $c$ having outlines chosen in such manner as to reduce the head resistance and which will be determined either by calculation or experimentally. Preferably, these streamlined structures $c$ shall be so shaped that any vertical section thereof has a zero lift angle of incidence with respect to the local flow of air.

As a rule, this will involve giving these streamlined structures $c$ a general helicoid shape since their angle of incidence shall vary from the point where they are jointed to the main body to their free end where they are jointed to the respective streamlined casings or fenders $b$.

This is due to the fact that, at a given level the inclination of the streamlines with respect to a horizontal plane decreases as the distance to main body $a$ increases. Therefore if, close to main body $a$, the angle of incidence of the streamline structures must have an incidence different from the zero lift angle without interaction with main body $a$, at infinity, these streamline structures should have only an incidence equal to said zero lift angle.

The front streamlined casings $b$ may either pivot together which the front wheels of the vehicle, being for instance suspended to and supported by the streamline structures through which the wheels are jointed with the main body, or they may be wide enough for permitting the wheels to pivot inside them. In the latter case, the jointing streamline structure shall be constituted by the wheel streamlined casing and the wheel shall pivot inside.

Figure 6:
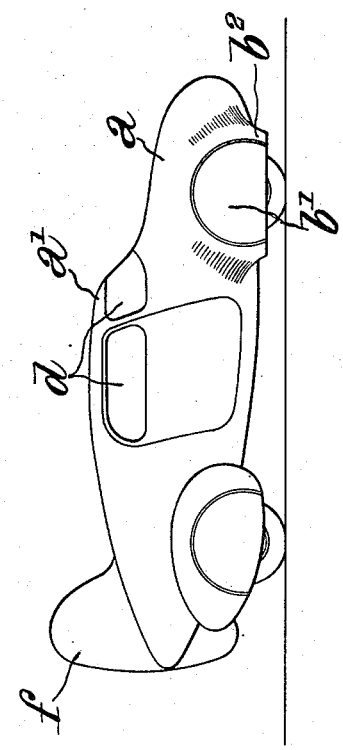
Fig. 6 is a longitudinal elevational view of an automobile vehicle according to another embodiment of the invention.
Figure 7:
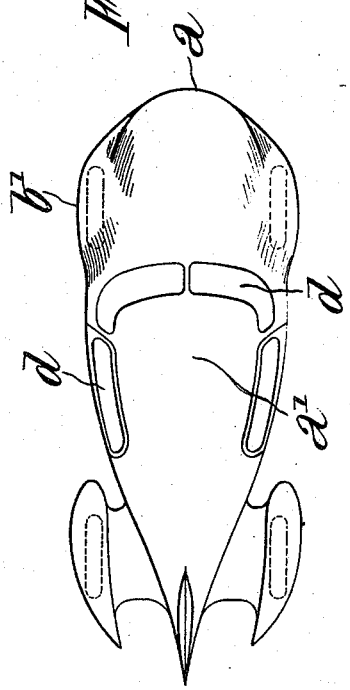
Fig. 7 is a plan view corresponding to Fig. 6.

If, now, at least some of the wheels of the vehicle must be enclosed inside the body thereof the question of providing a streamlined casing for said wheels shall not occur. As a matter of fact these wheels may be only partly enclosed inside the vehicle body. In this case, and for the portion of the wheel in question, said wheel shall be provided with an envelope $b^1$ traced in such manner as to be jointed with main body $a$ through surfaces having continuous radiuses of curvature (Figs. 6 to 8). The tracing of these envelopes shall be effected with exactly the same rules as will be hereinafter set forth for tracing the streamlined structures.

Furthermore, the lower portion of the wheels shall be preferably surrounded by a streamlined envelope $b^2$ having an incidence equal to the zero lift angle as above explained with reference to streamlined casings $b$, these streamlined envelopes being pointed outwardly with envelopes $b^1$ and inwardly with the main body $a$.

A vehicle devised as above explained includes a juxtaposition of streamlined structures having, as the case may be, either an incidence equal to the zero lift angle, or an incidence equal to the sum (in absolute value) of this zero lift angle and of the supplementary incidence necessary for taking into account the various interactions that may occur.

A vehicle devised in this way shall give results much better than vehicles such as devised at the present time.

The latter generally have an incidence which is zero (and not equal to the zero lift angle), or even positive.

On the other hand, the mud-shields, wheels, etc., of automobiles such as devised at the present time attack air under great angles, which would be sufficient for destroying the good effects obtained by employing a streamlined body of suitable shape.

According to another feature of the present invention, the streamlined body of the vehicle is given a shape such that the transverse plane corresponding to the maximum area of section of said body (which will be hereinafter called "main plane of section") is inclined downwardly and frontwardly.

It is a known fact that, in the volume occupied by a passenger seated in the vehicle or by several passengers disposed side by side, the maximum breadth is at the level of the elbows of the passengers, that is to say in a well determined vertical plane and at a well determined level.

Above this level, the maximum breadth corresponds to the shoulders of the passengers and is located behind this vertical plane, while, below this level, the maximum breadth corresponds to the hips of the passengers and is located ahead of this vertical plane.

The various maximum breadth above mentioned are therefore located approximately in a transverse plane inclined downwardly and frontwardly, and the inclination of which depends upon the inclination of the seats.

According to the present invention, the "main plane of section" B of streamlined body $a$ shall be given an inclination of the same kind, preferably the same, as the plane just above mentioned.

With this arrangement, it will be possible to clear the rear and the bottom of the vehicle from a point located more at the front, and therefore to more easily obtain an upward direction of the rear point of the streamlined body, which permits of more easily obtaining the negative incidence above mentioned.

Furthermore, the inclination of the main plane of section B shall permit of reducing the total stresses for a given area of said main section and a given length of the vehicle.

Preferably, the outline of the section of body $a$ through this main plane of section will be rounded off as much as possible (Fig. 5) so as to eliminate as much as possible transverse resistances.

For instance, in the case of an automobile the seats of which are adapted to receive two passengers side by side the section through plane B shall be given an ovoid shape.

Once the mechanical elements of the vehicle have been set in position, the volume to be left for receiving the passengers has been determined and the position, either inclined or not, of main plane B has been chosen, it is of course necessary to give the body the most favorable shape possible for reducing head resistance in accordance with the principles above stated.

For this purpose it may be advantageous to utilize at least some of the following features:

Concerning first the vertical sections of the streamlined body, they advantageously consist of parabolic lines of any degree whatever, tangent to horizontal lines at the points $x$, $y$, where they intersect the main plane B (the main body $a$ being assumed to be supported with the negative incidence corresponding to the minimum head resistance as above explained) and passing through the front and rear points, eventually, in the case of a streamlined body having pointed ends, as shown in Fig. 2.

Preferably, and whatever be the shapes of the sections, said sections will comply with the condition that their radius of curvature vary along them without discontinuity, and in particular that the radii of curvature of the respective curves at points $x$ and $y$ may be the same, which permits to avoid eddying as might result from a sudden variation of the curvature.

When the shape of streamlined body $a$ must include a rounded end at the front, one may have recourse to theoretical outlines (for instance Joukowski outlines) continuous from the front toward the rear and traced in such manner that they have a horizontal tangent at points $x$ and $y$ where they intersect the main plane B (Fig. 3).

Finally the curves corresponding to the vertical sections of the body may consist of portions of ellipses for the part of the curves located in front of the main plane B and radioids at least for the portions of curve located behind said main plane.

It is known that radioids have the interesting property that their radius of curvature is inversely proportional to the length of the travel along the curve, which corresponds to very favorably aerodynamic properties concerning the production of turbulent streams.

In this case also the arcs of curves will be jointed to one another at the point where they intersect the main plane B, with equal radii of curvature and with a horizontal tangent.

Concerning now the horizontal sections of the streamlined body, it should be noted that the main horizontal section, that is to say the section passing through the ends of the horizontal chord of maximum length of the section by plane B, shall advantageously be traced with curves having a double curvature whenever the wheels shall not be enclosed in the main streamlined body, which has the advantage of increasing the distance between the section and the wheel or the streamlined casing $b$ that surrounds said wheel (Fig. 4).

Of course, if only the wheels of one of the sets of wheels are located on the outside of the main streamlined body, I may utilize curves having a double curvature only for the portion of said streamlined body that corresponds to said wheels.

For instance when the front wheels must be enclosed in the streamlined body, it is particularly advantageous to give the horizontal sections of said body the shape of theoretical profiles with rounded front ends.

Advantageously, and whatever be the other characteristics of the streamlined body, the curves forming the outlines of the horizontal sections shall also be radioids which, in the example that is considered, will be joined to one another at points $x^1$, $y^1$ where they intersect the main plane B, with equal radii of curvature and with a horizontal tangent parallel to the longitudinal plane of symmetry of the vehicle.

If the arrangement of the vehicle makes it necessary, the glass portions $d$ of the front part of the vehicle shall be carried by a top portion $a^1$, surrounding the heads and shoulders of the passengers, so that said glass panes $d$ may be less inclined with respect to the vertical direction, thus improving visibility. This arrangement is shown in Fig. 6.

This top portion $d$ of the vehicle shall preferably be designed as above explained with reference to streamlined body $a$, that is to say its sections shall be curves the radius of curvature of each of which varies without discontinuity when moving along the curve, with tangencies of the second degree everywhere and more especially where this top portion is joined to the main body $a$. Advantageously, the top portion $a^1$ shall comprise elements for joining the conical or cylindrical surfaces of the glass panes with the surface of the main body $a$, so as to form a connection between the curvature of the glass panes at a point and the curvature of the main body where it is joined to the top portion $a^1$, without discontinuity or sudden variation of curvature. In this way the head resistance is reduced to a minimum.

Once the external shape of the vehicle has been determined in such manner as to obtain a $Cx$ coefficient (that is to say a front resistance) as low as possible, for instance by utilizing the features above described, or at least some of them, it is necessary to deal with the position of the zero metacenter of this vehicle.

As a rule, and for instance with the shapes above described, this metacenter is located ahead the front part of the streamlined body, so that, with a lateral wind, an aerodynamic instability would appear which would be all the more important as the $Cx$ would be smaller. This instability would be sufficient for rendering the vehicle useless.

In order to obviate this drawback, vehicles of the type with which the present invention is concerned will be provided with vertical fins of such size, and arranged in such manner, that the zero metacenter will be brought closer to the center of gravity and advantageously in the immediate vicinity thereof, or even at the center of gravity, which corresponds to disposing these fins at the rear part of the main streamlined body.

But the presence of these fins increases the $Cx$ and the $Cy$ of the whole so that these fins shall preferably be given the minimum area.

I may make use, for each vehicle, either of a single fin disposed in the vertical plane of symmetry of the vehicle and which may be divided into two portions one of which is located above the main body of the vehicle while the other one is located under the body, this lower part may follow the plane of symmetry of the body as $g^3$ (Fig. 3), and include the central part of rear axle and propelling shaft if necessary. A plurality of fins may also be used which will permit to obtain a relatively low $Cy$, because the fins will mask one another to a certain extent with a lateral wind.

When several fins are utilized, one of them may be combined with each of the streamline casings $b$, of the rear wheels, if such casings exist.

In this case, these wheel casings will be amplified (in projection on a plane parallel to the longitudinal plane of the vehicle) sufficiently for obtaining the desired result. Such fins are shown in dotted lines at $e$ in Fig. 3.

Besides, in the case of a plurality of vertical fins, and especially if they are to be carried by streamlined casings $b$, these fins will preferably be disposed on either side of the main body $a$ in such manner that they may be at least partly masked by said body. In this way the increase of the $Cy$ will be reduced to a minimum.

Whatever be the arrangement that is chosen for the fins and especially if only one fin is used, as shown at $f$ in Fig. 3, the vertical outline of the fin can be composed of two portions of ellipses $g^1$ and $g^2$ the major axes of which are disposed perpendicular to streamlines of the air about the fin.

Also these fins are given a height as great as possible for practical purposes.

Concerning now the sections of said fins, they are advantageously determined as follows:

Supposing first that there is a single fin $f$ carried by a streamlined body $a$, the outlines are homothetic for the various sections taken, along the height of the fin, by planes parallel to the natural lines of flow of air, the inclination of these lines, with respect to a horizontal plane decreasing, as shown by Fig. 3, as the distance to the streamlined body increases. Preferably, these sections shall have a length of about fifteen times their thickness and will correspond to airfoil sections of symmetric biconvex shape.

Finally, in the case of lateral fins, they will be designed in such manner that their various sections all have a zero lift angle of incidence with respect to the relative wind, which will generally involve warping these fins in order that the condition above mentioned may be complied with at all levels.

In every particular case, the shape of these fins shall have to be determined by taking into account the manner in which air flows around main body $a$, which can be done either by calculation or rather experimentally.

In any case, the fins made as above indicated shall ensure a minimum axial resistance and the maximum displacement toward the rear of the zero metacenter for a given surface in transverse projection.

These fins will permit of obtaining the best possible results with streamline bodies made as above described, the provision of such fins being, in most cases, absolutely necessary.

While I have, in the above description, disclosed what I deem to be practical and efficient embodiments of the present invention, it should be well understood that I do not wish to be limited thereto as there might be changes made in the arrangement, disposition and form of the parts without departing from the principle of the present invention as comprehended within the scope of the appended claims.

What I claim is:

1. A land vehicle of the type described, comprising a streamlined body of a longitudinal vertical cross section which normally produces a lift at a positive angle of attack, and wheels for normally supporting said body at a fixed angle with respect to the ground substantialy equal to the algebraic sum of the zero lift angle of incidence of the body in free air and an additional angle equal to the angle of incidence which gives a zero effect with respect to the lift caused by the vicinity of the ground, said last angle being constant for all speeds of the vehicle.

2. A land vehicle of the type described, comprising a streamlined body of a longitudinal vertical cross section which normally produces a lift at a positive angle of attack, and wheels for normally supporting said body substantially at a fixed angle at which the combined lift produced by the movement of the body through free air and by the vicinity of the ground is zero, said angle being constant for all speeds of the vehicle.

3. A vehicle according to claim 2, further including wheels located on the outside of the body, fenders for said wheels, axles extending between said body and wheels, and streamlined fairings surrounding said axles and extending between said body and the corresponding wheel fenders, said fairings being so shaped that any vertical section thereof has a zero lift angle of incidence with respect to the streamlines of the air around it.

4. A land vehicle of the type described which comprises wheels and a streamlined body supported by said wheels, the longitudinal axis of the body being downwardly and forwardly inclined, said body being so shaped that the transverse plane corresponding to the maximum area of section of said body is inclined downwardly and forwardly.

JEAN EDOUARD ANDREAU.